United States Patent [19]

Derbyshire et al.

[11] 4,206,062
[45] Jun. 3, 1980

[54] OVERBASING CHEMICAL PROCESS

[75] Inventors: Philip E. Derbyshire, Camberley; Howard M. de Silva, Bracknell, both of England

[73] Assignee: Edwin Cooper and Company Limited, Bracknell, England

[21] Appl. No.: 912,364

[22] Filed: Jun. 5, 1978

[30] Foreign Application Priority Data

Jun. 14, 1977 [GB] United Kingdom ............ 24865/77

[51] Int. Cl.$^2$ .................. C10M 1/40; C10M 1/32; C10M 3/34; C10M 3/26
[52] U.S. Cl. .................................. 252/33.2; 252/33.3
[58] Field of Search .................... 252/33.3, 33.2, 33

[56] References Cited

U.S. PATENT DOCUMENTS 2,956,018  10/1960  Carlyle et al. ................... 252/18
3,609,076  9/1971  Sabol et al. ..................... 252/33.2

*Primary Examiner*—Irving Vaughn
*Attorney, Agent, or Firm*—Donald L. Johnson; Robert A. Linn; Joseph D. Odenweller

[57] ABSTRACT

A process for making an overbased low-soap alkaline earth metal hydrocarbylsulfonate in a single stage by mixing in an inert diluent (a) a hydrocarbyl sulfonic acid of 400–1500 molecular weight, (b) alkaline earth metal oxide or hydroxide in an amount to provide a stoichiometric excess equivalent to a total base number of at least 200 and to provide a "metal ratio" of at least $0.02 \times$ mol wt of the sulfonic acid, (c) an alkanol of 1–4 carbon atoms, preferably methanol, (d) water and (e) ammonium formate and then passing carbon dioxide into the mixture to convert excess alkaline earth metal base to carbonate.

34 Claims, No Drawings

OVERBASING CHEMICAL PROCESS

BACKGROUND

Alkaline earth metal hydrocarbyl sulfonates have long been used as detergents in crankcase lubricating oils. They are often overbased to provide an alkaline reserve in the oil which neutralizes acids and inhibits corrosion. Overbasing methods are disclosed in U.S. Pat. No. 2,956,018 and U.S. Pat. No. 3,027,325.

Promoters have been used in the overbasing stage such as the ammonium salt of aliphatic acids described in U.S. Pat. No. 3,609,076.

The overbasing converts excess alkaline earth metal base in the mixture to colloidal metal carbonate which is stabilized in the oil diluent by alkaline earth metal sulfonate detergent (referred to as "soap") in the oil. It is most desirable to have as high a content of colloidal alkaline earth metal carbonate as can be stabilized in the oil. It is also desirable from an economic viewpoint to use as little soap as possible in stabilizing the colloidal alkaline earth metal carbonate. Such a product having maximum alkaline earth metal carbonate and minimum alkaline earth metal sulfonate is referred to as a "high-base:low-soap" product. When making high-base:low-soap calcium additives it has in the past been customary to conduct the overbasing reaction of carbon dioxide with alkaline earth metal base in two stages introducing only part of the base in each stage. If it was attempted to add the entire amount of metal base and to overbase in one stage the reaction mixture would become cloudy and gel, giving an unacceptable product.

SUMMARY

According to the present invention a process is provided for making an overbased alkaline earth metal sulfonate having a "total base number" of at least 200 and a "metal ratio" of at least 0.02×mol wt of the hydrocarbyl sulfonic acid, more preferably 0.025 mol wt of the sulfonic acid. The process uses a hydrocarbylsulfonic acid of a particular molecular weight range, a very low amount of methanol and water and ammonium formate promoter. The low level of methanol and water were found to be critical in avoiding gel.

DESCRIPTION OF THE PREFERRED EMBODIMENTS

A preferred embodiment of the invention is a process for making an overbased low-soap alkaline earth metal (preferably calcium) hydrocarbyl sulfonate having a total base number of at least 200, more preferably at least about 300, and a metal ratio of at least about 0.02×mol wt of the hydrocarbyl sulfonic acid using a single overbasing stage, said process comprising mixing in an inert diluent (a) a hydrocarbyl sulfonic compound selected from the group consisting of alkaryl sulfonic acids and petroleum sulfonic acids having an average molecular weight of about 400–1500 or an alkaline earth metal salt thereof, (b) an alkaline earth metal base selected from the group consisting of oxides and hydroxides or mixtures thereof in an amount sufficient to provide a stoichiometric alkaline excess equivalent to a total base number of at least 200 and to provide a metal ratio of at least about 0.02×mol wt of the hydrocarbyl sulfonic acid, (c) methanol in an amount to provide about 0.2–2 moles per mole of alkaline earth metal oxide or hydroxide, (d) water in an amount of 0.2 up to about 2.0 moles per mole of alkaline earth metal oxide or hydroxide, and (e) ammonium formate in an amount to provide about 0.05–0.5 mole per mole of alkaline earth metal oxide or hydroxide and passing carbon dioxide into the mixture until substantially all of said alkaline excess of alkaline earth metal base is converted to alkaline earth metal carbonate and recovering said overbased low soap alkaline earth metal hydrocarbyl sulfonate.

The "total base number" (TBN) also referred to as "base number" is a measure of the alkaline reserve in the product in terms of its stoichiometric equivalent of mg KOH per gram of product. In this terminology a product containing 27 weight percent excess calcium carbonate will have a TBN of about 300. The process gives a product having a TBN of at least 200. More preferably the process is conducted to give a TBN of at least 250. In the most preferred embodiment the process is conducted to give a TBN of at least 300. There is no real maximum on TBN, but for practical purposes they seldom exceed about 550.

"Metal ratio" is the ratio of the amount of alkaline earth metal present as alkaline earth metal carbonate to the amount of alkaline earth metal present as alkaline earth metal sulfonate. It can be readily calculated that a product containing 26.74 weight percent calcium carbonate (TBN 300) and 17.5 weight percent calcium sulfonate of a sulfonic acid having a molecular weight of 480 would have a metal ratio of 15.3.

The minimum metal ratio is defined in terms of the average molecular weight of the hydrocarbyl sulfonic acid. The minimum metal ratio is 0.02×mol wt of the hydrocarbyl sulfonic acid. More preferably, the metal ratio is even higher. In this more preferred embodiment made possible by this process the metal ratio is at least about 0.025×mol wt of the hydrocarbyl sulfonic acid. For example, if the sulfonic acid has an average molecular weight of 480, the metal ratio should be at least 9.6, and more preferably 12. In the past it has been necessary to use a two-stage overbasing reaction in order to obtain metal ratios of this magnitude without gelling the product.

The process is applicable to any hydrocarbyl sulfonic acid having an average molecular weight of about 400–1500, more preferably about 400–1100 and most preferably 440–600. These can be, for example, petroleum sulfonates, referred to as mahogany acids derived from the sulfonation of petroleum stocks. In a highly preferred embodiment the sulfonic acids are alkaryl sulfonic acids such as alkylbenzene or alkylnaphthalene sulfonic acids. Suitable alkyl groups contain from 10 to about 30 carbon atoms or more. Likewise, higher molecular weight alkyls derived from alkylation with polyolefin (e.g. polybutenes) having molecular weights up to about 2000 can be used to give hydrocarbyl sulfonic acids somewhat above the preferred range, but still useful.

Preferred sulfonic acids are the alkaryl sulfonic acids also referred to as alkylbenzene sulfonic acids.

Alkaryl sulfonic acids can be made from conventional methods such as by alkylating benzene, toluene or naphthalene or aromatic mixtures with olefins containing about 10–30 carbon atoms or more (e.g. with polyolefin). The most suitable olefins are cracked-wax olefins, propylene trimers and tetramers and olefin mixtures derived from aluminum alkyl chain growth. Alkylation is effected using a Friedel-Crafts (e.g. AlCl$_3$ or BF$_3$) catalyst. The alkylaromatic mixture contains predominantly mono- and di-alkyl products. These alkyl aromatics are then sulfonated by known methods such as by reaction with sulfuric acid, oleum, sulfur trioxide and the like.

Thus, preferred sulfonic acids include octadecylbenzene sulfonic acid, didodecylbenzene sulfonic acid, docosylbenzene sulfonic acid, triacontylbenzene sulfonic acid, dodecyloctadecylbenzene sulfonic acid, didecylbenzene sulfonic acid, dodecylnaphthalene sulfonic acid, hexadecylnaphthalene sulfonic acid, dinonylbenzene sulfonic acid and mixtures thereof and the like.

The hydrocarbyl sulfonic acids preferably have an average molecular weight of about 400–1500. More preferred are the alkylbenzene sulfonic acids having an average molecular weight of about 400–1100 and most preferably 440–600.

The process is conducted in an inert diluent. This is preferably a hydrocarbon diluent having a boiling range of about 50°–180° C. Examples of these are hexane, heptane, toluene, xylene and the like. More preferably the diluent is a petroleum ether which boils in the 50°–80° C. range. Inert diluents which boil in this range are preferred because they can be readily distilled out of the reaction mixture after the overbasing stage is complete.

The amount of diluent can vary over a wide range. Best results can be obtained using about 100–500 parts of low boiling inert diluent per each 60 parts of alkaline earth metal base. A more preferred range is about 100–300 parts of such diluent per each 60 parts of metal base.

In addition to the low boiling diluent, it is generally preferred to add a mineral oil diluent. It is not necessary to add the mineral oil prior to the overbasing reaction since this can be conducted in the low boiling hydrocarbon diluent. However, some mineral oil must be added prior to distilling out the low boiling hydrocarbons following the overbasing stage. The total amount of mineral oil used will be the amount required to give the desired TBN. Generally, about one-half of the total amount of mineral oil is added prior to the overbasing stage and the remainder added after overbasing when part of the low boiling solvent has been removed. In this manner, the volumetric requirements of the process are minimized.

Henceforth the process will be described in terms of the overbased calcium sulfonate embodiment. It should be understood that where the term calcium appears it could be replaced with alkaline earth metal, especially magnesium.

If desired, the hydrocarbyl sulfonic acid can be used in the form of its calcium salt. This method is not preferred. When operating in this manner the amount of calcium base present as the salt should be included in calculating the moles of calcium base present in the reaction mixture.

The amount of methanol added to the overbasing reaction is critical. The use of a low amount of methanol in conjunction with a low amount of water leads to a highbase product having a high metal ratio in a single overbasing stage without gelling.

The amount of methanol is controlled to be about 0.2–2 moles per mole of calcium oxide or hydroxide used in the overbasing reaction. A preferred range is about 0.5–1.0 mole of methanol per mole of calcium oxide or hydroxide.

It is important that the amount of water added be limited to less than about 2 moles per mole of calcium oxide or hydroxide. Water referred to is the water added to the reaction as such including that in aqueous solutions of the other constituents. It does not refer to water formed in situ by neutralization. A minimal amount of water is required in the process or the reaction will gel. Usually this minimal amount is provided in the other reactants added. For example, formic acid and ammonia are usually added in aqueous solution which provides sufficient water. The minimal amount is about 0.2 mole per mole of calcium base. In Example 1 excellent results were obtained when about 0.25 mole of water was initially present in the reaction mixture.

A preferred amount of water is less than about 1.5 moles per mole of calcium oxide or hydroxide. More preferably the amount of water added is less than 0.8 mole, e.g. 0.2–0.8 mole, per mole of calcium oxide or hydroxide. Excellent results have been achieved using less than 0.6 mole of water per mole of calcium oxide or hydroxide and this represents a highly preferred embodiment.

When the process is used to make overbased magnesium sulfonate the preferred amount of water is about 1.5–2.0 moles per mole of magnesium oxide, hydroxide or mixture thereof.

Basic calcium compounds can be calcium oxide or calcium hydroxide or mixtures thereof. From an economic viewpoint it is preferred to use calcium oxide (i.e. quicklime). The amount of calcium compound added should be enough to (1) provide a stoichiometric alkaline excess over the sulfonic acid to give a TBN of at least about 200 and preferably around 300 or more and (2) provide a metal ratio of calcium as excess basic calcium reserve to calcium as calcium sulfonate of at least about 0.02, most preferably about $0.025 \times$ mol wt of the hydrocarbyl sulfonic acid.

When the process is used to make overbased magnesium sulfonate it is preferred to use magnesium oxide.

Acting in concert with the other parameters of the process in achieving the high-base:low-soap product is ammonium formate which acts as a promoter. Ammonia and formic acid can be used in place of ammonium formate.

Surprisingly, other aliphatic carboxylic acids such as acetic acid, oxalic acid or maleic acid do not give equivalent results and result in gels when an attempt is made to achieve the same high-base:low-soap product in a single overbasing stage. Likewise, even the use of ammonium formate gave a gel when the amount of methanol was increased in excess of the limits of the present invention (cf Example 10).

The amount of ammonium formate is about 0.05–5 moles per mole of total calcium oxide or hydroxide. A more preferred amount is about 0.05–0.25 mole per mole of calcium oxide or hydroxide, and a most preferred amount is about 0.1 mole per mole of calcium oxide or hydroxide.

The ammonium formate can be added as such or ammonia and formic acid can be added separately forming ammonium formate in situ. When adding ammonia and formic acid separately the amount of ammonia added should be about 0.05–0.5 mole per mole of alkaline earth metal oxide or hydroxide and the amount of formic acid added should be about 0.05–0.5 mole per mole of alkaline earth metal oxide or hydroxide. The moles of each need not be the same. Thus, there can be a stoichiometric excess of either ammonia or formic acid over that required to form ammonium formate. This can be the seen in Example 12 where the amount of formic acid added was 0.09 mole per mole MgO and the amount of ammonia added was 0.13 mole per mole of MgO. Excellent results were achieved.

Similarly, when the ammonium formate is preformed it can contain excess ammonia or formic acid as long as the amount of ammonia and formic acid present in any form including that in the form of ammonium formate are within the range of 0.05-0.5 mole per mole of alkaline earth metal oxide or hydroxide.

Optionally, when ammonium formate is preformed either ammonia or formic acid can be added in addition to that present as preformed ammonium formate as long as the overall net result is that the total ammonia and formic acid added in any form including the chemicals themselves or the ammonium formate salt are within the range of 0.05-0.5 mole per mole of alkaline earth metal oxide.

Ammonia may be added as the anhydrous gas or as an aqueous solution in which case its water content forms part of the total water added to the system. In one mode formic acid is added to the reaction mixture and ammonia or aqueous ammonia added during the initial portion of the carbon dioxide carbonation. In this embodiment the ammonia addition should be substantially complete prior to injecting over one-half of the total carbon dioxide required to complete the overbasing reaction. This is especially advantageous when making an overbased magnesium sulfonate.

When it is said that the mixture contains ammonium formate it is meant that it contains the components necessary to give ammonium formate, but it is not known with certainty just what form this ammonium formate might take in the mixture either initially or during the course of the process. All that is required is that the ammonium formate be added to the mixture or that ammonia and formic acid be added in an amount which would give 0.05-0.5 mole of ammonium formate per mole of alkaline earth metal oxide or hydroxide.

After forming the mixture of inert diluent, mineral oil, hydrocarbyl sulfonic acid, calcium base, methanol, water and ammonium formate in the proper ratio, carbon dioxide is passed into the stirred mixture. This is the overbasing stage. It can be conducted over a broad temperature range of, for example, 0°-75° C., more preferably 0°-60° C. Very good results are obtained by starting the reaction at ambient temperature conditions (15°-30° C.) and allowing the reaction exotherm to raise the temperature to the 45° to 55° C. range at which it is held by external cooling or reflux until carbon dioxide uptake is complete.

Following the overbasing reaction part of the volatile inert diluent, methanol and water are distilled out to decrease the volume. This initial distillation is carried out up to about 65°-70° C. liquid temperature. If a less volatile inert diluent is used it may be necessary to go somewhat higher in temperature to make room for the addition of the mineral oil diluent. The remainder of the mineral oil required to achieve the desired TBN is conveniently added at this point. Heating is then continued up to about 150° C. to distill out the remaining low boiling inert diluent, methanol and water. To assure that the product is substantially free of low boiling diluent, it is preferred to inject steam into the liquid phase for a short time at 150° C. thereby steam distilling residual volatiles. Finally, the product is vacuum stripped at about 150°-165° C. at about 50 mm Hg abs and then filtered. Following filtration, the product is generally analyzed and the TBN adjusted to spec by adding more oil if needed.

The manner according to which the process is conducted is shown in the following examples.

EXAMPLE 1

In a reaction vessel was placed 55 g process oil, 153 g 50/50 hexane-heptane mixture, 20 g methanol, 61 g calcium oxide, 7.5 ml saturated aqueous ammonium hydroxide (30% $NH_3$) and 6 g of 90% formic acid solution. Following this 95 g of warmed (appx 60° C.) alkylbenzene sulfonic acid solution (57 wt percent active, avg mol wt 480) was added. The mixture was stirred vigorously and heated to about 50° C. Carbon dioxide was sparged into the mixture at a rate of about 270 ml/min while maintaining the temperature at about 50° C. by moderate cooling. After about 75 minutes carbon dioxide uptake ceased and the reaction temperature dropped.

Carbon dioxide sparging was stopped. An additional 55 g of process oil was added and the mixture heated to about 150° C. while distilling out volatiles. Steam was then injected for about 15 minutes at 150° C. to remove additional volatiles. Then vacuum was applied to complete volatile removal at 165° C., 50 mm Hg abs. The product was filtered using a filter aid coated filter paper in a 5.5 cm Buchner funnel to give a clear bright product. To be considered acceptable, at least 100 ml must filter in 25 min. The filtration rate was 12.9 ml/min. The product analyzed:
TBN: 329
Total calcium: 12.3 wt %
Calcium as soap: 0.76 wt % (calc)
Calcium soap: 19 wt %
Metal ratio 15.2

EXAMPLE 2

An experiment was conducted in the same manner as Example 1. The filtration rate was 12.3 ml/min. The product analyzed:
TBN: 331
Total calcium: 12.5 wt %
Calcium as soap: 0.787 wt % (calc)
Calcium soap: 19.7%
Metal ratio: 15.9

EXAMPLE 3

This experiment was conducted the same as Example 1 except the alkylbenzene sulfonic acid had an average mole weight of 500 and 63 g of calcium oxide was used. The filtration rate was 11.3 ml/min. The product analyzed:
TBN: 331
Total calcium: 12.23 wt %
Calcium as soap: 0.73 wt %
Metal ratio: 15.75

EXAMPLE 4

This experiment was conducted the same as Example 1 except the alkylbenzene sulfonic acid had an average mole weight of 545. Filtration rate was 10.1 ml/min and the clear bright product analyzed:
TBN: 329
Total calcium: 11.92 wt %
Calcium as soap: 0.67 wt %
Metal ratio: 16.8

EXAMPLE 5

This experiment shows an attempt to prepare a high-base:low-soap product without using formic acid.

In a reaction vessel was placed 60.5 g process oil, 153 g hexane/heptane, 20 g methanol, 67.5 g calcium oxide, 7.5 ml aqueous ammonium hydroxide and 95 g alkylbenzene sulfonic acid (as in Example 1). Carbon dioxide was passed into the vigorously stirred mixture at 50° C. until uptake ceased (79 mins). The mixture was heated to 150° C. while distilling out volatiles. An additional 60.5 g process oil was added during this period. Then the solution was steam distilled at 150°–153° C. for 16 minutes. It was then vacuum distilled up to 170° C. at 50 mm Hg abs. The product was filtered giving a filtration of only 4.1 ml/min. This is less than half the rate using the process of the present invention and is considered barely acceptable for a commercial operation. The product analyzed:
TBN: 336
Total calcium: 12.4 wt %
Calcium as soap: 0.73 wt %
Metal ratio: 16.98

EXAMPLE 6

Example 5 was repeated to verify the filtration rate which this time was found to be 3.4 ml/min during first 25 min at which time the filter plugged. The product analyzed:
TBN: 338
Total calcium: 12.3 wt %
Calcium as soap: 0.725 wt %
Metal ratio: 16.96

EXAMPLE 7

This experiment was the same as Examples 5 and 6 except that 6 g of formic acid was added. The filtration rate through the same 5.5 cm Buchner was 9.8 ml/min, which is considered acceptable, contrary to that in Examples 5 and 6. The product analyzed:
TBN: 334
Total calcium: 12.4 wt %
Calcium as soap: 0.74 wt %
Metal ratio: 16.76

EXAMPLE 8

This experiment was a repeat of Example 7 to verify the results. The filtration rate was 15.5 ml/min, a very acceptable rate. The product analyzed:
TBN: 328
Total calcium: 12.4 wt %
Calcium as soap: 0.75 wt %
Metal ratio: 16.53

EXAMPLE 9

This experiment was carried out substantially as Example 1, except formic acid was used without ammonia.

In a reaction vessel was placed 55 g of process oil, 153 g 50/50 hexane-heptane mixture, 20 g methanol, 61 g calcium oxide, 6 g 90% formic acid and 95 g of warm alkylbenzene sulfonic acid solution (57% active, avg mol wt 480). The mixture was stirred vigorously and $CO_2$ injected at 50°–51° C. (270 ml/min). Uptake stopped after about 37 minutes. The mixture was heated to distill out volatiles and at 67° C. liquid temperature an additional 55 g process oil was added. Heating was continued to 150° C. at which temperature steam was injected for 13 minutes to steam distill volatiles. Pressure was then reduced to about 50 mm Hg abs and residual volatiles distilled up to 167° C. The product was filtered (12.7 ml/min) and analyzed:
TBN: 234.6
Total calcium: 9.49 wt %
Calcium as soap: 0.87 wt %
Calcium soap: 21.7 wt %
Metal ratio: 9.72

The TBN did not attain the preferred 300 nor did the metal ratio reach the preferred 0.025× mol wt of the sulfonic acid (viz 12).

EXAMPLE 10

This example uses an amount of methanol in excess of the critical amount of the present process.

In a reaction vessel was placed 55 g process oil, 153 g 50/50 hexane-heptane mixture, 174 g methanol (5 mol methanol per mol CaO), 61 g CaO, 7.5 ml aq ammonia, 6 g 90% aq formic acid and 95 g warm alkylbenzene sulfonic acid (57% active, avg mol wt 480). The mixture was vigorously stirred and $CO_2$ injected at 43°–51° C. Thickening was observed after 22 minutes. The mixture completely gelled after about 50 minutes $CO_2$ injection at 270 ml/min.

The following examples illustrate the process conducted using magnesium oxide as the alkaline earth metal base.

EXAMPLE 11

In a reaction vessel was placed 55 g of process oil, 153 g 50/50 hexane-heptane mixture, 35 g methanol, 46.2 g magnesium oxide, 16.7 g water, 15 ml aq 30% $NH_4OH$, 12 g aq 90% formic acid and 95 g warm alkylbenzene sulfonic acid (57% active, 480 avg mol wt). While stirring vigorously, carbon dioxide was injected at 41°–46° C. at 270 ml/min over a 50-minute period. After work-up as in previous examples including addition of 55 g additional process oil, the product was an overbased magnesium alkaryl sulfonate having a TBN of 261.

EXAMPLE 12

In a reaction vessel was placed 89 g of process oil, 150 g hydrocarbon solvent with a boiling range of 120°–160° C. and being 85% aliphatic, 15% aromatic in character, 33.7 g methanol, 65.5 g magnesium oxide, 7.7 g aq 90% formic acid and 111.7 g alkylbenzene sulfonic acid solution (70 wt percent active, 522 avg mol wt). While stirring vigorously, carbon dioxide was injected at 34°–64° C. at 500 ml/min over a 45-minute period and at 61°–64° C. at 270 ml/min over a further 8-minute period until uptake ceased; a mixture of 37.8 g water and 13.8 ml aq 30% $NH_4OH$ was added over the initial 15 min of carbonation. The solution was heated to 120° C. while distilling out volatiles. An additional 80 ml of solvent and 25 g of body aid was charged. The product was filtered using 25 g of filter aid coating a 541 Whatman filter paper in a 11 cm Buchner funnel; complete filtration of the product was achieved in 3 mins which was considered satisfactory. After stripping the solvent off under vacuum, the product analyzed:
TBN: 430
Total magnesium: 9.95 wt %
Magnesium as soap: 0.59 wt % (calc)
Metal ratio: 15.9

EXAMPLE 13

This experiment was conducted in the same manner as Example 12 except that the hydrocarbon solvent used was toluene, all of the carbon dioxide was injected at 40°-60° C. at 270 ml/min over a 77-minute period and the solvent addition prior to filtration was 120 ml. Filtration was complete in 2-5 mins. After stripping the solvent off under vacuum, the product analyzed:
TBN: 445
Total magnesium: 10.05 wt %
Magnesium as soap: 0.60 wt % (calc)
Metal ratio: 15.75

EXAMPLE 14

This experiment was conducted in the same manner as Example 13 except that the charge of magnesium oxide was reduced to 59.5 g and all the aq 30% $NH_4OH$ and water was placed in the reaction vessel prior to the start of the reaction. An excellent filtration rate was achieved. After stripping the solvent off under vacuum, the product analyzed:
TBN: 408
Total magnesium: 9.30 wt %
Magnesium as soap: 0.65 wt % (calc)
Metal ratio: 13.31

EXAMPLE 15

This experiment was conducted in the same manner as Example 12 except that the charge of process oil was 63.5 g and 137.2 g of a higher molecular weight alkylbenzene sulfonic acid solution (57 wt percent active, 545 avg mol wt) was used. The carbon dioxide was injected at 42°-67° C. at 500 ml/min over a 45-minute period and at 67° C. at 270 ml/min over a further 10-minute period. The quantity of solvent added prior to filtration was approximately 160 g. Filtration was complete in 6.5 mins. After stripping the solvent off under vacuum, the product analyzed:
TBN: 432
Total magnesium: 9.51 wt %
Magnesium as soap: 0.64 wt % (calc)
Metal ratio: 13.86

The products of the invention are useful as additives for engine crankcase lubricating oils. In this function they act as detergents and prevent rust and corrosion. They are added to the lubricating oil in an amount sufficient to provide the required degree of protection. This is generally in the range which supplies 0.5 to 10 weight percent overbased sulfonate in the formulated oil.

It is not only useful in mineral lubricating oils, but also in synthetic oils and blends of mineral and synthetic oils. Typical synthetic oils include olefin oligomers such as hydrogenated 1-decene trimer, synthetic esters (e.g. di-2-ethylhexyl adipic), alkylated benzene (e.g. di-dodecylbenzene) and the like.

In formulating such oils other conventional additives are usually included such as zinc dialkyldithiophosphate, VI improvers such as poly-laurylmethacrylate or olefin copolymers, ashless detergents such as polybutenyl succinimides and the like.

We claim:

1. A process for making an overbased low-soap alkaline earth metal hydrocarbyl sulfonate having a total base number of at least 200 and a metal ratio of at least 0.02× the average mol wt of the hydrocarbyl sulfonic acid using a single overbasing stage, said process comprising mixing in an inert diluent
   (a) a hydrocarbyl sulfonic acid selected from the group consisting of alkaryl sulfonic acid and petroleum sulfonic acids having an average molecular weight of about 400-1500 or alkaline earth metal salts thereof,
   (b) an alkaline earth metal base selected from the group consisting of oxides and hydroxides in an amount sufficient to provide a stoichiometric alkaline excess over that required to neutralize said sulfonic acid equivalent to a total base number of at least 200 and to provide a metal ratio of at least 0.02× the average molecular weight of said hydrocarbyl sulfonic acid,
   (c) methanol in an amount to provide about 0.2-2 moles per mole of said alkaline earth metal oxide or hydroxide,
   (d) water in an amount of 0.2 up to about 2.0 moles per mole of said alkaline earth metal oxide or hydroxide,
   (e) ammonium formate in an amount to provide about 0.05-0.5 mole per mole of said alkaline earth metal oxide or hydroxide,
   and passing carbon dioxide into the mixture until substantially all of said alkaline excess of alkaline earth metal base is converted to alkaline earth metal carbonate and recovering said overbased low-soap alkaline earth metal hydrocarbyl sulfonate.

2. A process of claim 1 wherein said alkaline earth metal is calcium and said hydrocarbyl sulfonic acid is an alkaryl sulfonic acid or calcium salt thereof.

3. A process of claim 2 wherein said total base number is at least about 250.

4. A process of claim 3 wherein said metal ratio is at least 0.025× the average mole wt of said alkaryl sulfonic acid.

5. A process of claim 4 wherein the amount of methanol is 0.5-1.0 mole per mole of said calcium base.

6. A process of claim 5 wherein the amount of water added is about 0.2-0.8 mole per mole of said calcium base.

7. A process of claim 6 wherein said alkaryl sulfonic acid has an average molecular weight of about 400-1100.

8. A process of claim 2 wherein said alkaryl sulfonic acid has an average molecular weight of about 440-600.

9. A process of claim 8 wherein said metal ratio is at least 0.025× the average molecular weight of said alkaryl sulfonic acid.

10. A process of claim 9 wherein said total base number is at least about 250.

11. A process of claim 10 wherein the amount of methanol is about 0.5-1.0 mole per mole of said calcium base.

12. A process of claim 11 wherein the amount of water added is about 0.2-0.8 mole per mole of said calcium base.

13. A process of claim 12 wherein the amount of said ammonium formate is about 0.05-0.25 mole per mole of said calcium base.

14. A process of claim 1 wherein said alkaline earth metal base is magnesium oxide.

15. A process of claim 14 is wherein said hydrocarbyl sulfonic acid is an alkaryl sulfonic acid or magnesium salt thereof.

16. A process of claim 15 wherein said total base number is at least about 250.

17. A process of clain 16 wherein the amount of methanol is 0.5-1.0 mole per mole of said magnesium oxide.

18. A process of claim 17 wherein the amount of water added is about 1.5-2.0 moles per mole of said magnesium oxide.

19. A process of claim 18 wherein said alkaryl sulfonic acid has an average molecular weight of about 400–1100.

20. A process of claim 15 wherein said alkaryl sulfonic acid has an average molecular weight of 440–600.

21. A process of claim 20 wherein said metal ratio is at least $0.025 \times$ the average molecular weight of said alkaryl sulfonic acid.

22. A process of claim 20 wherein said total base number is at least about 250.

23. A process of claim 22 wherein the amount of methanol is 0.5–1.0 mole per mole of magnesium oxide.

24. A process of claim 23 wherein the amount of water added is about 1.5–2.0 moles per mole of magnesium oxide.

25. A process of claim 24 wherein said ammonium formate is formed in situ by adding formic acid to the mixture comprising alkaryl sulfonic acid, magnesium oxide, methanol and water and adding ammonia to said mixture in an amount sufficient to neutralize said formic acid, said adding of ammonia being conducted prior to injecting in excess of one-half of the total carbon dioxide required.

26. A process for making an overbased low-soap alkaline earth metal hydrocarbyl sulfonate having a total base number of at least 200 and a metal ratio of at least $0.02 \times$ the average mol wt of the hydrocarbyl sulfonic acid using a single overbasing stage, said process comprising mixing in an inert diluent
  (a) a hydrocarbyl sulfonic acid selected from the group consisting of alkaryl sulfonic acid and petroleum sulfonic acids having an average molecular weight of about 400–1500 or alkaline earth metal salts thereof,
  (b) an alkaline earth metal base selected from the group consisting of oxides and hydroxides in an amount sufficient to provide a stoichiometric alkaline excess over that required to neutralize said sulfonic acid equivalent to a total base number of at least 200 and to provide a metal ratio of at least $0.02 \times$ the average molecular weight of said hydrocarbyl sulfonic acid,
  (c) methanol in an amount to provide about 0.2–2 moles per mole of said alkaline earth metal oxide or hydroxide,
  (d) water in an amount of 0.2 up to about 2.0 moles per mole of said alkaline earth metal oxide or hydroxide,
  (e) ammonia in an amount to provide about 0.05–0.5 mole per mole of said alkaline earth metal oxide or hydroxide,
  (f) formic acid in an amount to provide about 0.05–0.5 mole per mole of said alkaline earth metal oxide or hydroxide,
and passing carbon dioxide into the mixture until uptake substantially stops, thereby converting alkaline earth metal base to alkaline earth metal carbonate.

27. A process of claim 26 wherein said alkaline earth metal is calcium and said hydrocarbyl sulfonic acid is an alkaryl sulfonic acid or calcium salt thereof.

28. A process of claim 27 wherein said ammonia is added to the mixture prior to injecting in excess of about one-half of the total carbon dioxide required.

29. A process of claim 26 wherein said alkaline earth metal base is magnesium oxide and said hydrocarbyl sulfonic acid is an alkaryl sulfonic acid or magnesium salt thereof.

30. A process of claim 29 wherein said total base number is at least about 250.

31. A process of claim 30 wherein the amount of water added is about 1.5–2.0 moles per mole of said magnesium oxide.

32. A process of claim 31 wherein said ammonia is added to the mixture prior to injecting in excess of about one-half of the total carbon dioxide required.

33. A process of claim 32 wherein said ammonia is added to the mixture during the initial part of the carbon dioxide addition.

34. A process of claim 33 wherein said ammonia is added as an aqueous ammonia solution.

* * * * *